United States Patent
Saimi

(10) Patent No.: US 7,588,819 B2
(45) Date of Patent: Sep. 15, 2009

(54) WINDOW GLASS FOR VEHICLE

(75) Inventor: Takashi Saimi, Aiko-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 241 days.

(21) Appl. No.: 11/671,575

(22) Filed: Feb. 6, 2007

(65) Prior Publication Data

US 2007/0128448 A1    Jun. 7, 2007

Related U.S. Application Data

(63) Continuation of application No. PCT/JP2005/014591, filed on Aug. 9, 2005.

(30) Foreign Application Priority Data

Aug. 10, 2004  (JP) .............................. 2004-233407

(51) Int. Cl.
*B32B 17/06*   (2006.01)
*B32B 3/26*    (2006.01)
(52) U.S. Cl. .................... 428/304.4; 428/432; 428/433; 428/426; 428/318.4; 428/318.6
(58) Field of Classification Search .................. None
See application file for complete search history.

(56) References Cited

U.S. PATENT DOCUMENTS 6,402,013 B2 *  6/2002  Abe et al. .................... 228/223

2002/0159913 A1 * 10/2002 Ito et al. ...................... 420/560
2005/0112291 A1 *  5/2005 Okajima et al. ............. 427/447

FOREIGN PATENT DOCUMENTS

| JP | 53-107654 | 8/1978 |
| JP | 59-026984 | 2/1984 |
| JP | 62-056380 | 3/1987 |
| JP | 63-185870 | 8/1988 |
| JP | 5-050286 | 3/1993 |
| JP | 2000-141078 | 5/2000 |
| JP | 2000-326088 | 11/2000 |
| WO | WO 01/80611 | 10/2001 |
| WO | WO 03/076239 | 9/2003 |
| WO | WO-03/076239 | * 9/2003 |
| WO | WO 2004/068643 | 8/2004 |

* cited by examiner

*Primary Examiner*—Ling Xu
(74) *Attorney, Agent, or Firm*—Oblon, Spivak, McClelland, Maier & Neustadt, P.C.

(57) ABSTRACT

A window glass for a vehicle, wherein the window glass includes a glass plate, a conductor formed on a surface of the glass plate and an electronic component electrically connected to the conductor via a solder, wherein the solder has gap portions formed therein, is lead-free and contains a buffer component and a conductive component, and wherein the conductive component is present in the solder in an amount of 58-93 volume %, based on a total volume of the solder, or the solder has a specific gravity of 70-93%, based on a specific gravity of the conductive component, whereby the adhesive strength of the solder and the breaking strength of the glass plate are improved.

20 Claims, No Drawings

WINDOW GLASS FOR VEHICLE

CROSS-REFERENCE TO RELATED APPLICATIONS

The present application is a continuation of International patent application PCT/JP05/014591, filed on Aug. 9, 2005, which claims priority to Japanese patent application JP 2004-233407, filed on Aug. 10, 2004.

TECHNICAL FIELD

The present invention relates to a window glass for vehicles constituted by electrically connecting a conductor formed on a glass plate to an electronic component by means of a lead-free solder.

BACKGROUND ART

In recent years, a window glass for vehicles, especially, a window glass for automobiles, is provided with various functions. For example, a defogger for removing fogging on a window glass or a glass antenna having functions as an antenna for e.g. an AM, FM or TV receiver, may be mentioned. The defogger removes fogging on a window glass in such a manner that an Ag paste containing Ag as the main component is fired on the surface of a glass plate, and to such a fired product of an Ag paste, an electric current is applied to warm up the glass. The glass antenna is produced in such a manner that an antenna pattern capable of receiving radio waves having various frequencies, such as AM, FM and TV, is formed on the surface of a glass plate by firing an Ag paste, and then the antenna pattern is connected to e.g. an amplifier for a radio or TV.

In order that such a defogger and a glass antenna can perform the desired functions, it is necessary to electrically connect, by means of a solder, a fired product of an Ag paste to an electronic component such as a terminal for connection to an electronic equipment provided on the interior side of a car. Heretofore, a solder containing Pb, such as a Pb—Sn—Bi—Ag type solder, has been usually used.

However, it takes a lot of troubles in treatment of the solder containing Pb at the time of disposal, and regulations against the use of a solder containing Pb are now being studied in various countries, such as ELV (End of Life Vehicles) directive or WEEE&RoHS (Waste Electrical and Electronic Equipment & Restriction of the use of certain Hazardous Substances in electrical and electronic equipment) directive in Europe. Therefore, a lead-free solder containing no Pb is desired not only for a solder to be used for e.g. an electrical equipment, but also for a solder to be used for a window glass for automobiles.

In order to comply with such a demand, a solder having a composition is disclosed wherein Ti, Al and Cu are incorporated to a solder containing Sn and Zn as the main components (see, for example, Patent Document 2). Further, a solder having a composition wherein Al, In, Ag, Cu and Zn are incorporated to a solder containing Sn as a main component (see, for example, Patent Document 2), and a solder containing Sn and Bi as the main components (see, for example, Patent Document 3) are disclosed. It is considered that such lead-free solders are, without containing Pb, capable of firmly bonding oxide materials of e.g. glass or ceramics to one another by means of the solders, and have an effect such that peeling is less likely to occur after soldering.

Patent Document 1: JP-A-2000-326088
Patent Document 2: JP-A-2000-141078
Patent Document 3: WO2004/068643

DISCLOSURE OF THE INVENTION

Problems that the Invention is to Solve

However, in a case where the solder disclosed in Patent Document 1 is used for soldering an electronic component and a fired product of an Ag paste formed on the surface of a window glass for automobiles, the adhesion to the interface on the Ag paste side was likely to be low. The cause for such deterioration of the adhesion lies in silver dissolution. Namely, Ag in the fired product of an Ag paste and Sn in the solder are excessively reacted, and Ag in the fired product of an Ag paste is diffused and dissolved in the solder, so that the solder tends not to spread, and therefore the adhesion area becomes small, whereby it is impossible to obtain sufficient adhesive strength of the solder.

Further, in a case where the solder disclosed in Patent Document 2 is used for soldering an electronic component and a fired product of an Ag paste formed on the surface of a window glass for automobiles, the strength of the glass was likely to be deteriorated at the time of solidification of such a solder. The cause for such deterioration of the glass strength lies in shrinkage of the volume of the solder itself in a process such that the electronic component and the solder once become to have a high temperature at the time of soldering, and then return to the normal temperature. The amount of shrinkage of such a solder is larger than the amount of shrinkage of the glass, whereby the tensile stress is formed at the surface of the glass plate, and thus the strength of the glass and the adhesive strength of the solder deteriorate.

Further, in the case of the solder disclosed in Patent Document 3, reduction of the stress at the initial stage is taken into consideration, but its Young's modulus is high, and therefore the stress to be formed in the cold tends to be high. Accordingly, when the solder is used in cold climates, the glass is likely to have cracking and thus the strength of the glass deteriorates.

Further, the solder disclosed in Patent Document 3 is improved by taking into consideration the reduction of the tensile stress on the glass surface which is formed by soldering of the electronic component and the fired product of an Ag paste formed on the surface of the above glass. However, the Young's modulus thereof is still high, and therefore the solder is further shrunk when used in the cold such as in cold climates, whereby the strength of the glass deteriorates and cracks are likely to form on the surface of the glass plate.

In view of the above problems, it is an object of the present invention to provide a window glass for automobiles, wherein a conductor formed on a glass plate and an electronic component are bonded by means of a lead-free solder, whereby sufficient adhesive strength and glass strength are secured

MEANS TO SOLVE THE PROBLEMS

The present invention is to solve the above-mentioned problems and provides the following:

(1) A window glass for vehicles, which comprises a glass plate, a conductor formed on the glass plate, and an electronic component electrically connected to the conductor by means of a solder, wherein the solder comprises a buffer component and a conductive component containing no lead, and the proportion of the volume of the conductive component based on the volume of the entire solder is from 58 to 93%.

(2) A window glass for vehicles, which comprises a glass plate, a conductor formed on the glass plate, and an electronic component electrically connected to the conductor by means of a solder, wherein the solder comprises a buffer component and a conductive component containing no lead, and the proportion of the specific gravity of the entire solder based on the specific gravity of the conductive component is from 70 to 93%.
(3) The window glass for vehicles according to the above (1) or (2), wherein the solder is made of a cream solder comprising the conductive component which is a lead-free powdery solder, and the buffer component which is a paste-form flux.
(4) The window glass for vehicles according to the above (3), wherein the powdery solder has a particle size of from 5 to 100 μm.
(5) The window glass for vehicles according to the above (3) or (4), wherein the powdery solder has a solidus of from 150 to 240° C.
(6) The window glass for vehicles according to the above (3), (4) or (5), wherein the powdery solder essentially contains from 96.0 to 99.0 mass % of Sn and from 1.0 to 4.0 mass % of Ag.
(7) The window glass for vehicles according to the above (6), wherein the powdery solder further contains at most 1.2 mass % of Cu.

EFFECT OF THE INVENTION

According to the present invention, the following effect can be obtained.

It is possible to provide a glass for vehicles, wherein a conductor formed on glass plate and an electronic component are electrically connected, by preventing poor adhesive strength and deterioration of the glass strength which used to be problems when a conventional lead-free solder was used.

The solder constituting the present invention comprises a buffer component and a conductive component containing no lead in a state where the solder is subjected to fusion-bonding to a conductor formed on a glass plate and an electronic component, and the proportion of the volume of the conductive component based on the volume of the entire solder is from 58 to 93%. In the conductive component in the fusion-bonded solder, a number of gaps are formed, and the buffer component is present in the gaps. Since such a buffer component is deformed when the electronic component or the conductive component is shrunk in a cooling process after soldering, the stress exerted by shrinkage at the time of cooling is dispersed, and it is possible to lower the tensile stress formed on the surface of the glass plate. As a result, deterioration of the strength of the glass plate is prevented. With regard to the adhesive strength of the solder itself, the conductive component is strongly bonded to the conductor and the electronic component at the solder/conductor interface and the electronic component/solder interface, whereby no poor adhesion occurs.

If the proportion of the volume of the conductive component based on the volume of the entire solder exceeds 93%, the buffer component becomes insufficient, whereby the stress is insufficiently dispersed and the tensile stress formed on the glass plate cannot be lowered. From the viewpoint of the strength of the glass plate, the proportion of volume of the conductive component occupying the volume of the entire solder is preferably at most 90%, more preferably at most 87%. Further, if the proportion of the volume of the conductive component is less than 58%, the conductive component and the conductor can not sufficiently be bonded at the solder/conductor interface, whereby the adhesive strength tends to be insufficient. Also at the electronic component/solder interface, the adhesive strength likewise tends to be insufficient.

From the viewpoint of the adhesive strength, the proportion of the volume of the conductive component occupying the volume of the entire solder is at least 63%, more preferably at least 67%.

Further, the solder constituting the present invention comprises a buffer component and a conductive component containing no lead in such a state as fusion-bonded to a conductor formed on the glass plate and to an electronic component, and the specific gravity of the entire solder based on the specific gravity of the conductive component is from 70 to 93%. The present invention is not limited to the following specific gravity, but in the present invention, the specific gravity of the conductive component is from about 7.0 to about 8.0, and the specific gravity of the buffer component is preferably from about 0 to about 2.0. Accordingly, when the proportion of the volume of the conductive component occupying in the volume of the entire solder is calculated from the specific gravities of the conductive component and the buffer component, the specific gravity of the entire solder based on the specific gravity of the conductive component is from 70 to 93%, and this proportion of the specific gravity is meant for the same as the above proportion of the volume.

In order to measure the proportion of the volume of the conductive component based on the volume of the entire solder by cutting out the solder portion from the window glass for vehicles of the present invention, it takes a lot of troubles such as a removal of the buffer component. Whereas, by expressing the same with the specific gravity of the entire solder and the specific gravity of the conductive component which can relatively readily be measured in this manner, it is possible to express the present invention more clearly. Accordingly, also in the construction of the present invention as defined in (2) above, the stress formed by shrinkage at the time of cooling after the soldering is dispersed, whereby it is possible to lower the tensile stress formed on the surface of the glass plate. As a result, deterioration of the strength of the glass plate is prevented.

From the viewpoint of the strength of the glass plate, the proportion of the specific gravity of the entire solder based on the specific gravity of the conductive component is at most 92%, more preferably at most 90%. Further, from the viewpoint of the adhesive strength, the proportion of the specific gravity of the entire solder based on the specific gravity of the conductive component is at least 74%, more preferably at least 76%.

Further, the solder constituting the present invention is made of a cream solder comprising a conductive component which is a lead-free powdery solder, and the buffer component which is a paste-form flux. After the soldering, many gaps are formed in the fusion-bonded powdery solder. Void spaces or a flux resin which is present in such gap portions, is deformed when the electronic component or the solder is shrunk in a step of cooling after the soldering, whereby the stress formed by the shrinkage is dispersed, and thus the tensile stress formed on the surface of the glass plate is lowered. As a result, deterioration of the stress of the glass plate is prevented. Further, by bonding of the powdery solder itself and the solidification of the flux in the cream solder, the conductor formed on the glass plate and an electronic component are strongly bonded, whereby no adhesion failure occurs.

Further, by adjusting the average particle size of the powdery solder to preferably from 5 to 100 μm, particularly preferably from 20 to 60 μm, the sizes of the gaps formed in the fusion-bonded powdery solder after the soldering can be adjusted to a level suitable to absorb the shrinkage in a step of cooling after the soldering. Further, such a solder makes it possible to form a cream solder which can readily be processed and suppress deterioration by oxidation of the solder.

Further, by adjusting the solidus of the powdery solder to be preferably from 150 to 240° C., the heat resistance can be made to have no practical problems as a product and the soldering can be carried out at a low temperature, whereby the resulting stress itself can be reduced.

Further, if an electronic component is soldered to a fired product of an Ag paste and formed on a glass plate by using a lead-free solder having Sn as a main component, Sn is excessively reacted with Ag contained in the fired product of the Ag paste, and silver dissolution occurs, whereby the adhesive strength deteriorates. Whereas, as in the present invention, by using an Sn—Ag type powdery solder, Ag is incorporated in the solder, whereby it is possible to prevent silver dissolution.

Further, when Cu is incorporated therein, the effect of improving the heat cycle resistance can be obtained.

BEST MODE FOR CARRING OUT THE INVENTION

Now, the present invention will be described in detail with reference to preferred embodiments.

The window glass for vehicles of the present invention is produced in such a manner that a fired product of an Ag paste having Ag as the main component, such as a defogger for removing fogging or a glass antenna for e.g. AM, FM or TV, is formed on the surface of a window glass, and such a fired product of the Ag paste and the electronic component are soldered by using a lead-free solder, to establish connection to e.g. an amplifier for a radio or television set via such an electronic component.

The composition of the solder constituting the window glass for vehicles of the present invention will be described as follows. As the solder constituting the present invention, it is possible to use a known lead-free cream solder comprising a lead-free powdery solder and a paste-form flux.

The flux may be a liquid-form or a paste-form at normal temperature, and may further be of rosin type or non-rosin type, and it is not particularly limited.

As the base material for the flux, not only WW rosin, a polymer rosin or a hydrogenated rosin, but also a rosin ester, maleic acid modified polyethylene glycol or the like, may be used.

Further, as the solvent for the flux, an alcohol such as α-terpineol, β-terpineol, hexyleneglycol, butylcarbitol, benzyl alcohol, isopalmityl alcohol, isostearyl alcohol or lauryl alcohol, an ester such as isobutyl adipate, diethyl phthalate, dibutyl phthalate or butylcarbitol acetate may be used.

Further, as an activator for the flux, an amine salt of hydrochloric acid or hydrobromic acid, a water-soluble dicarboxylic acid or its amine salt may, for example, be preferably used. For example, a hydrochloride or a hydrobromide of an amine having relatively small carbon number such as methylamine, dimethylamine, trimethylamine, ethylamine, diethylamine, triethylamine, n-propylamine, di-n-propylamine, tri-n-propylamine, isopropylamine, diisopropylamine, triisopropylamine, butylamine, dibutylamine, monoethanolamine, diethanolamine, triethanolamine or a cyclic amine, malonic acid, succinic acid, glutaric acid, maleic acid, fumaric acid, adipic acid, lactic acid, diglycol acid or their amine salts may be mentioned.

Further, the powdery solder may, for example, be spherical or elliptical, although the shape is not particularly limited. As a spherical powdery solder, one having an average diameter of from 5 to 100 μm may, for example, be mentioned. Especially, from the viewpoint of antioxidation and processability, one having an average diameter of from 20 to 60 μm is preferred. Further, with regard to the composition of the powdery solder, an Sn—Ag type alloy or an Sn—Ag—Cu type alloy is preferred. In the case of an Sn—Ag type alloy, it is possible to use one containing from 96.0 to 99.0 mass % of Sn and from 1.0 to 4.0 mass % of Ag. Further, in order to improve the heat cycle resistance, Cu may be incorporated in an amount of at most 1.2 mass %.

The above cream solder is applied on a fired product of an Ag paste formed on a glass plate, and an electronic component such as a terminal for a connector of a cable connected to an electronic equipment on the car interior side, is placed on the cream solder applied on the Ag paste. Then, hot air is blown from a hot air generator to the cream solder to fuse the cream solder, whereby the fired product of an Ag paste and an electronic component are fixed and electronically connected. The hot air is preferably brown at a temperature of from 300 to 500° C., with a distance between a nozzle for hot air and the cream solder being from 10 to 100 μm, for from 5 to 40 seconds. By heating in such a manner, the temperature of the cream solder itself will not be so high, and the temperature of the glass itself will not become so high locally, whereby no substantial thermal stress will be formed in the glass plate, and further, breakdown of the glass plate by thermal shock can be prevented.

Further, by fusion-bonding of the powdery solder, gaps are formed in the fusion-bonded solder. By deformation of void spaces and the flux resin in the gap portions, the stress formed by thermal shrinkage of the terminal and the solder is dispersed, whereby the tensile stress formed on the surface of the glass plate is lowered.

Accordingly, the cream solder to be used in the present invention is not limited to the above. It is possible to use any cream solder so long as it is one wherein the average particle diameter of the powdery solder in the cream solder is from 5 to 100 μm, no Pb is contained in the composition, and it is free from a silver dissolution phenomenon.

Further, with regard to the solder constituting the window glass for vehicles of the present invention, the proportion of the volume of the powdery solder based on the volume of the entire solder is from 58 to 93%, is namely, the proportion of the specific gravity of the entire solder based on the specific gravity of the powdery solder is from 70 to 93%. Such a proportion can be achieved also by keeping the above cream solder from being completely hardened.

For example, the cream solder may be hardened by hot air, and the hot air may be stopped short of complete hardening. By keeping the paste-form flux from being completely hardened, the proportion of the specific gravity of the entire solder based on the specific gravity of the powdery solder becomes from 70 to 93%. If it is less than 70%, the solder is insufficiently hardened, whereby the terminal tends to fall off at the solder/Ag interface due to material failure of the solder. Further, if it exceeds 93%, the effect for lowering the stress to the condition of the complete hardening will be insufficient, whereby the terminal tends to fall off due to material failure of the surface layer of the glass.

Further, a method may be used wherein a semi-hardened cream solder is put between a terminal and a fired product of an Ag paste, and hot air is blown thereto for fusion-bonding. In such a case, the cream solder is cast in frame, which is then put in a drying oven and dried to have the cream solder semi-hardened. After such drying, the cream solder is cut into an appropriate shape to meet with the shape of the base portion of the terminal. The shape of the semi-hardened cream solder is not particularly limited, but the cream solder is preferably formed into a flat shape to meet with the shape of the terminal, thereby to achieve uniform hardening.

The drying temperature is suitably determined together with the drying time, depending upon e.g. the size of the frame so long as the drying temperature is a temperature to vaporize a solvent in the cream solder at a level not higher than the temperature where the powdery solder starts to fuse. A temperature lower by about 10° C. than the fusion temperature of the powdery solder is effective and preferred.

The semi-hardened cream solder is attached to the base portion of a terminal via the cream solder which is not hardened, and such a terminal is put on the fired product of the Ag paste on the glass surface, followed by fixing by hot air. When the window glass for vehicles of the present invention is produced by such a method, the adhesive strength with the terminal is improved.

EXAMPLES

Now, Examples of the present invention will be presented, but the present invention is not limited thereto.

Example 1

As a material to be joined, a glass plate (soda lime glass) having a size of 100 mm×100 mm and a thickness of 3.5 mm was used. On the surface of the peripheral portion of such a glass plate, an Ag paste was printed, followed by heating to 700° C. The glass plate was left to stand until its temperature lowered to normal temperature, to let a fired product of an Ag paste form on the surface of the glass plate. On such a fired product of an Ag paste, 0.3 g of a lead-free cream solder RX203 (manufactured by NIHON HANDA CO., LTD) having a metal content of a 96.5% Sn/3.5% Ag alloy was applied, a copper-made terminal having a bonded-surface area of 25 mm² and a thickness of 0.8 mm was put thereon, and heating was carried out for 20 seconds by hot air of 400° C. so that the distance between a hot air outlet and the cream solder would be 20 mm, to have the fired product of the Ag paste and the terminal bonded to obtain a glass plate provided with a terminal.

Example 2

A glass plate provided with a terminal was prepared in the same manner as in Example 1 except that a hot-air heating time was 25 seconds.

Example 3

A glass plate provided with a terminal was prepared in the same manner as in Example 1 except that a hot-air heating time was 30 seconds.

Comparative Example 1

A glass plate provided with a terminal was prepared in the same manner as in Example 1 except that a hot-air heating time was 15 seconds.

Comparative Example 2

A glass plate provided with a terminal was prepared in the same manner as in Example 1 except that a hot-air heating time was 35 seconds.

The adhesive strength between the solder and the glass plate was evaluated in such a manner that, after 24 hours of soldering, the terminal was pulled in a direction which was perpendicular to the surface of the glass plate, whereby the strength when the terminal was peeled was measured by a push-pull gauge.

Further, the specific gravity of the entire solder was measured in such a manner that the solder portion was cut out to measure its weight, and its volume was measured by using a measuring cylinder containing water. Then, the proportion of such a specific gravity based on the specific gravity of the metal content of the cream solder preliminarily measured was calculated.

These results are shown in Table 1.

TABLE 1

| | Type of Solder | Hot air Temperature | Hot Air Time | Proportion of Specific Gravity | Adhesive Strength | Peeling Mode |
|---|---|---|---|---|---|---|
| Ex. 1 | Cream | 400° C. | 20 seconds | 74% | 160N | Glass Material Failure |
| Ex. 2 | Cream | 400° C. | 25 seconds | 82% | 190N | Glass Material Failure |
| Ex. 3 | Cream | 400° C. | 30 seconds | 93% | 150N | Glass Material Failure |
| Comp. Ex. 1 | Cream | 400° C. | 15 seconds | 65% | 40N | Solder Material Failure |
| Comp. Ex. 2 | Cream | 400° C. | 35 seconds | 95% | 70N | Glass Material Failure |

From Table 1, it is evident that the samples in Examples 1 to 3 of the present invention are excellent in adhesive strength, and when the specific gravity falls in the range of the present invention, a paste-form flux exhibits effects in a cooling process to prevent deterioration of the adhesive strength. On the other hand, the adhesive strengths in Comparative Examples 1 and 2 are found to be inferior to those in Examples.

The following shows that, as the solder to be used in the present invention, a cream solder is preferred to a thread solder.

Example 4

A glass plate provided with a terminal was prepared in the same manner as in Example 1 except that 0.3 g of a lead-free cream solder PF305 (manufactured by NIHON HANDA CO., LTD) having a metal content of a 96.5% Sn/3% Ag/0.5% Cu alloy was applied.

Example 5

A glass plate provided with a terminal was prepared in the same manner as in Example 1 except that, instead of heating the cream solder by hot air, a soldering iron adjusted to 290° C. was directly contacted with the terminal for heating for 10 seconds.

Comparative Example 3

A lead-free thread solder #221 (manufactured by NIHON HANDA CO., LTD) having a metal content of a 96.5% Sn/3.5% Ag alloy was preliminarily put on the back side of the terminal, and in the same manner as in Example 1, heating was carried out for 15 seconds by a hot air of 400° C., and then a fired product of an Ag paste and a terminal were bonded to prepare a glass plate provided with a terminal. The rest is the same as in Example 1.

Comparative Example 4

A glass plate provided with a terminal was prepared in the same manner as in Comparative Example 3 except that, instead of heating a thread solder by hot air, a soldering iron adjusted to 290° C. was directly contacted with a terminal for heating for 5 seconds.

The adhesive strength between the solder and the glass plate was evaluated in such a manner that, after 24 hours of soldering, the terminal was pulled in a direction which was perpendicular to the surface of the glass plate whereby the strength when the terminal was peeled was measured by a push-pull gauge.

Further, the glass breaking strength was evaluated in such a manner that upon expiration of 24 hours after the soldering, the center portion on the printed surface side of the fired product of the Ag paste on the glass plate was pushed in a direction perpendicular to the surface by a jig made of a steel ball having a diameter of 10 mm at the tip, and then the strength when the glass was cracked was measured by a push-pull gauge.

These results are shown in Table 2

TABLE 2

| | Type of Solder | Sn | Ag | Cu | Means for Soldering | Adhesive Strength | Glass Breaking Strength |
|---|---|---|---|---|---|---|---|
| Ex. 1 | Cream | 96.5 | 3.5 | 0 | Hot Air | 160N | 340N |
| Ex. 4 | Cream | 96.5 | 3 | 0.5 | Hot Air | 150N | 320N |
| Ex. 5 | Cream | 96.5 | 3.5 | 0 | Soldering Iron | 150N | 310N |
| Comp. Ex. 3 | Thread | 96.5 | 3.5 | 0 | Hot Air | 120N | 270N |
| Comp. Ex. 4 | Thread | 96.5 | 3.5 | 0 | Soldering Iron | 120N | 200N |

From Table 2, it is evident that the samples in Examples 1, 4 and 5 of the present invention are excellent in adhesive strength and glass breaking strength. On the other hand, in Comparative Examples 3 and 4 in which solid-type thread solders are used, the glass breaking strengths are found to be inferior to those in Examples.

INDUSTRIAL APPLICABILITY

In a window glass for vehicles, particularly in a window glass for automobiles, heretofore, fixation of an electronic component and an electric conductor formed on the surface of the window glass for automobiles by using a lead-free solder was not practically used due to problems of deterioration in adhesive strength and glass strength. According to the present invention, it is possible to make a solder used for fixation of the electronic component and the electric conductor to be lead-free.

The entire disclosure of Japanese Patent Application No. 2004-233407 filed on Aug. 10, 2004 including specification, claims and summary is incorporated herein by reference in its entirety.

What is claimed is:

1. A window glass comprising a glass plate, a conductor formed on a surface of the glass plate and an electronic component electrically connected to the conductor via a solder, wherein the solder has gap portions formed therein, is lead-free and comprises a buffer component and a conductive component, and wherein the conductive component is present in the solder in an amount of 58-93 volume %, based on a total volume of the solder.

2. The window glass according to claim 1, wherein the solder is a cream solder, the buffer component is a paste-form flux, the conductive component is a powdered solder and the gap portions are void spaces or comprise a flux resin.

3. The window glass according to claim 1, wherein the conductive component is a powdered solder having an average particle diameter of 5-100 μm.

4. The window glass according to claim 1, wherein the conductive component is a powdered solder having an average particle diameter of 20-60 μm.

5. The window glass according to claim 1, wherein the conductive component is a powdered solder having a solidus temperature of 150-240° C.

6. The window glass according to claim 1, wherein the conductive component is a powdered solder comprising a Sn—Ag alloy comprising 96.0-99.0 wt. % of Sn and 1.0-4.0 wt. % of Ag.

7. The window glass according to claim 1, wherein the conductive component is a powdered solder comprising a Sn—Ag—Cu alloy comprising 96.0-99.0 wt. % of Sn, 1.0-4.0 wt. % of Ag and at most 1.2 wt. % of Cu.

8. The window glass according to claim 1, wherein the conductive component is present in the solder in an amount of 67-87 volume %, based on a total volume of the solder.

9. The window glass according to claim 1, wherein the solder has a specific gravity of 70-93%, based on a specific gravity of the conductive component.

10. The window glass according to claim 1, wherein the solder has a specific gravity of 76-90%, based on a specific gravity of the conductive component.

11. A window glass comprising a glass plate, a conductor formed on a surface of the glass plate and an electronic component electrically connected to the conductor via a solder, wherein the solder has gap portions formed therein, is lead-free and comprises a buffer component and a conductive component, and wherein the solder has a specific gravity of 70-93%, based on a specific gravity of the conductive component.

12. The window glass according to claim 11, wherein the solder is a cream solder, the buffer component is a paste-form flux, the conductive component is a powdered solder and the gap portions are void spaces or comprise a flux resin.

13. The window glass according to claim 11, wherein the conductive component is a powdered solder having an average particle diameter of 5-100 μm.

14. The window glass according to claim 11, wherein the conductive component is a powdered solder having an average particle diameter of 20-60 μm.

15. The window glass according to claim 11, wherein the conductive component is a powdered solder having a solidus temperature of 150-240° C.

16. The window glass according to claim 11, wherein the conductive component is a powdered solder comprising a Sn—Ag alloy comprising 96.0-99.0 wt. % of Sn and 1.0-4.0 wt. % of Ag.

17. The window glass according to claim 11, wherein the conductive component is a powdered solder comprising a Sn—Ag—Cu alloy comprising 96.0-99.0 wt. % of Sn, 1.0-4.0 wt. % of Ag and at most 1.2 wt. % of Cu.

18. The window glass according to claim 11, wherein the solder has a specific gravity of 76-90%, based on a specific gravity of the conductive component.

19. The window glass according to claim 11, wherein the conductive component is present in the solder in an amount of 58-93 volume %, based on a total volume of the solder.

20. The window glass according to claim 11, wherein the conductive component is present in the solder in an amount of 67-87 volume %, based on a total volume of the solder.

* * * * *